United States Patent

[11] 3,633,013

| [72] | Inventor | Ernst H. Dummermuth<br>East Cleveland, Ohio |
| --- | --- | --- |
| [21] | Appl. No. | 810,630 |
| [22] | Filed | Mar. 26, 1969 |
| [45] | Patented | Jan. 4, 1972 |
| [73] | Assignee | Allen-Bradley Company<br>Milwaukee, Wis. |

[54] VELOCITY CONTROL OF A NUMERICAL CONTROL SYSTEM
26 Claims, 6 Drawing Figs.

[52] U.S. Cl. .................................................... 235/151.11,
318/571, 318/573
[51] Int. Cl. ................................................. G05b 17/18,
G06f 15/46
[50] Field of Search ............................................. 235/151.11,
151.1, 151, 150.3, 150.31; 318/20.100, 20.102,
20.105, 20.110, 20.130, 20.132, 571

[56] References Cited
UNITED STATES PATENTS

| 3,286,085 | 11/1966 | Rado | 235/151.11 |
| --- | --- | --- | --- |
| 3,344,260 | 9/1967 | Lukens | 235/151.11 |
| 3,349,229 | 10/1967 | Evans | 235/151.11 |
| 3,443,178 | 5/1969 | Reuteler | 235/151.11 X |
| 3,479,574 | 11/1969 | Kosem | 235/151.11 X |
| 3,308,279 | 3/1967 | Kelling | 318/571 X |

*Primary Examiner*—Joseph F. Ruggiero
*Attorneys*—Arnold T. Ericsen and Richard C. Steinmetz, Jr.

ABSTRACT: Apparatus is disclosed for approximating the tool departure (the vector sum) D from commanded axis departures X, Y and Z in a numerical control system, and for obtaining a clock pulse train at a frequency $f_o$ as a function of D. The velocity V can be specified as part of the stored command information. The approximated departure D and velocity V are then employed to determine a feedrate number (FRN) from the relationship $V=FRN=D$ using a clock pulse train of frequency F in accordance with the equation $F \cdot V = F \cdot Q \cdot D$, where Q is a variable increased from zero until the equality of the equation is reached. Q is then the desired FRN which is entered into a conventional interpolator.

FIG. 1

INVENTOR.
ERNST DUMMERMUTH

VELOCITY CONTROL OF A NUMERICAL CONTROL SYSTEM

BACKGROUND OF THE INVENTION

This invention relates to vectorial velocity control of a numerically controlled machine tool, or similar device, in response to prestored instructions.

In a numerically controlled machine tool, the cutting tool is directed through the workpiece by specifying the desired departure of the tool from its present position with reference to three mutually orthogonal axes, X, Y, and Z. For optimum use of the machine, the departure D should be traversed at a maximum velocity, where D is the square root of the sum of the squares of the programmed distances X, Y and Z. That maximum velocity is dependent primarily upon the nature of the cutting tool and the composition of the material, and therefore remains constant.

The programmed distances X, Y and Z are stored on a punched tape, or the like, and read in blocks together with associated words, each word representing a control function. A linear interpolator counts out a discrete number of clock pulses to a servo system which converts them into a proportional (analog) signal to operate prime movers of the machine tool. A feedrate generator controls the frequency of the clock pulses to the linear interpolator, and the interpolator establishes the cycle time for each instruction, thereby controlling the velocity of the machine tool.

It is standard practice to control the feedrate generator with a stored feed command (feedrate number) given by a standard formula adapted for the relationship of the feedrate number (FRN), programmed departure ($D$), and desired velocity ($V$), as follows:

FRN=$V/D$ The velocity V is given by a table for all cutting tools and materials, and the departure D is calculated from the programmed distances X, Y and Z.

In the past, the feedrate number has been computed in advance for each departure programmed, and stored on the tape along with the values of X, Y and Z. The value of the departure D is normally not stored; however, for a constant velocity, the feedrate number reflects that value. The difficulty has been that although not stored, it has been necessary to compute it for each tool departure programmed in order to be able to store the feedrate number with the programmed values of X, Y and Z. It would be more convenient to program only the values of X, Y and Z, and store or enter into the control apparatus the desired velocity (such as 100 inches per minute) not related to any departure (vector sum of X, Y and Z) information. For a different combination of cutting tool and material, the same program can then be used by simply programming a different velocity. However, the control apparatus would then have to be adapted to effectively compute the feedrate number from the velocity and departure information.

The departure information is stored only in terms of motions along the machine control axes X, Y and Z. Accordingly, before the feedrate number can be computed, it is necessary to compute the departure D. It would be possible to provide apparatus to find the departure D as a scalar quantity from the values X, Y and Z read from the tape by squaring each value, adding the squares, and calculating the square root of that sum. However, the algorithm for that in a digital computing system is quite involved, particularly in the final step of computing the square root. Accordingly, if the feedrate number is not to be computed in advance and stored as part of the program, it would be desirable to have some simple way of computing the departure D.

The velocity is customarily stored in a format which conforms with Electronics Industry Association (EIA) standards, which is a three digit code $f(abc)$, commonly referred to as the "magic three." The first digit "$a$" specifies an exponent for powers of ten for a multiplier $10^{a-3}$ while the remaining two digits ($b$) specify the velocity in inches per minute as a decimal fraction. For example, the "magic three" code $f(620)$ is interpreted as $10^{6-3}(0.20)$ IPM which is equal to 200 inches per minute. This code permits a range of velocities from 0.01 to 990 inches per minute, a range that is simple for machine tools presently available. In adapting apparatus to effectively compute the feedrate number from programmed X, Y and Z information, and the desired velocity, it would be desirable to apply the EIA "magic three" code.

SUMMARY OF THE INVENTION

According to the present invention, the departure D is approximated in a two-axes system in accordance with the equations:

$$D=|X|+|0.5Y| \text{ if } |X|\geq|Y|$$
$$D=|Y|+|0.5X| \text{ if } |X|<|Y| \qquad (2)$$

The value of $D$ thus approximated is then employed to obtain an output pulse train at a frequency $f_o$ to be applied to a linear interpolator comprising rate multipliers for the command axes. For an even closer approximation, the departure $D$ may be approximated in accordance with the equations:

$$D=|X|+|0.5Y|-|0.1X| \text{ if } |0.5Y|-|0.1X|\geq 0$$
$$D=|X| \text{ if } |0.5Y|-|0.1X|<0 \quad |X|\geq|Y|$$
$$(3)$$

If $|X|<|Y|$, the values of $X$ and $Y$ have to be interchanged.

For three dimensional control the approximation for $D$ is as follows:

$$D=|X|+|0.5Y|-|0.1X|+|0.3Z| \text{ if } |0.5Y|-|0.1Z|\geq 0$$
$$D=|X|+|0.3Z| \text{ if } |0.5Y|-|0.1X|\geq 0$$
$$(4)$$

For this approximation it is necessary that $|X|<|Y|<|Z|$. The denomination of the axes commands as X, Y and Z are interchanged to achieve this sorting by magnitude such that the largest denominated X and the smallest is denominated Z, but only for the purpose of computing D. As just noted, the approximation is employed according to one feature of the invention, to control a pulse train source thereby producing an output pulse train $f_o$ inversely proportional to the approximated departure $D$. A linear interpolator is then employed to multiply the pulse train $f_o$ by the axes commands, such as $X$ and $Y$ for a two-axes system, to provide $f_o \cdot X$ and $f_o \cdot Y$ pulses to $X$ and $Y$ servos. In that manner, the tool velocity is maintained approximately constant for all $X$ and $Y$ commands. For a different velocity, the pulse train source is modified to change the frequency $f_o$ thereof proportionately. In the past, when a feedrate number was not provided, the practice had been to use the axis having the largest magnitude, and therefore the fastest speed, to control the frequency $f_o$. That was done by simply converting the pulse train from the rate multiplier of each axis to a proportional DC voltage, and applying each to a voltage controlled oscillator (through a buffer, the output of which would always be equal to the highest input voltage) to vary $f_o$ accordingly.

In more sophisticated systems it has become standard practice to store a feedrate number with the axis commands on the program tape where the number (FRN) is set equal to the ratio of the desired velocity $V$ to the programmed departure $D$ in order to obtain a pulse train at a frequency $f_o$ equal to $F \cdot FRN$, where $F$ is the constant frequency of a train of clock pulses.

In accordance with a significant feature of the present invention, the desired velocity V is stored, instead of the feedrate number, together with the axis commands. The corresponding feedrate number is then calculated from the equation $V=FRN \cdot D$ by multiplying a clock frequency $F$ by $V$ to obtain a reference frequency $f_R$, multiplying the clock frequency $F$ by a variable Q, and multiplying the product $Q \cdot F$ by the departure D. The product $Q \cdot F \cdot D$ is then compared with the reference frequency $f_R$ (which equals $V \cdot F$) and the variable Q is increased until $Q \cdot F \cdot D$ is equal to $V \cdot F$, at which time the variable Q is the desired FRN which may be applied directly to a feedrate generator comprising a rate multiplier to obtain a pulse train at a frequency proportional thereto. That pulse train is then applied to a conventional interpolator (axis command rate multipliers).

In accordance with a further feature of the invention, the velocity desired is specified in the EIA "magic three" code $f(abc)$ where the last two digits $(bc)$ are representative of a decimal fraction and the first digit is a positive integer to be added to the exponent of a multiplier $10^{-3}$ by which the fraction is to be multiplied to represent the desired velocity in inches per minute. In calculating the feedrate number by setting $F \cdot V = Q \cdot F \cdot D$, where $Q$ is the desired FRN as just noted, only the fraction $(.bc)$ is employed to multiply $F$ for the left-hand side of the equation. The multiplier $10^{a-3}$ is then introduced by effectively shifting the product $F \cdot Q$ or $F (.bc)$ the requisite number of decimal places, i.e. by shifting the clock frequency $F$ input and the associated multiplier $Q$ or $(.bc)$ a number of decades in a rate multiplier. In a preferred embodiment, the multiplier $10^{a-3}$ is introduced in the right-hand side of the equation as $10^{3-a}$ by shifting orders of decades in the rate multiplier for the product $Q \cdot F$. The $Q$ is then the required FRN (when $F \cdot V = Q \cdot F \cdot D$) that is applied as an input to a conventional linear interpolator to simultaneously meter pulses to all servosystems for the $X$, $Y$ and $Z$ axes. In that manner, the multiplier $10^{a-3}$ appears in the pulse train representing the product $Q \cdot F$ and in the feedrate number FRN when $Q.F \cdot D$ is equal to $F (.bc)$. Although a decimal system is disclosed, it should be appreciated that any radix may be selected for the system such as binary or octal.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
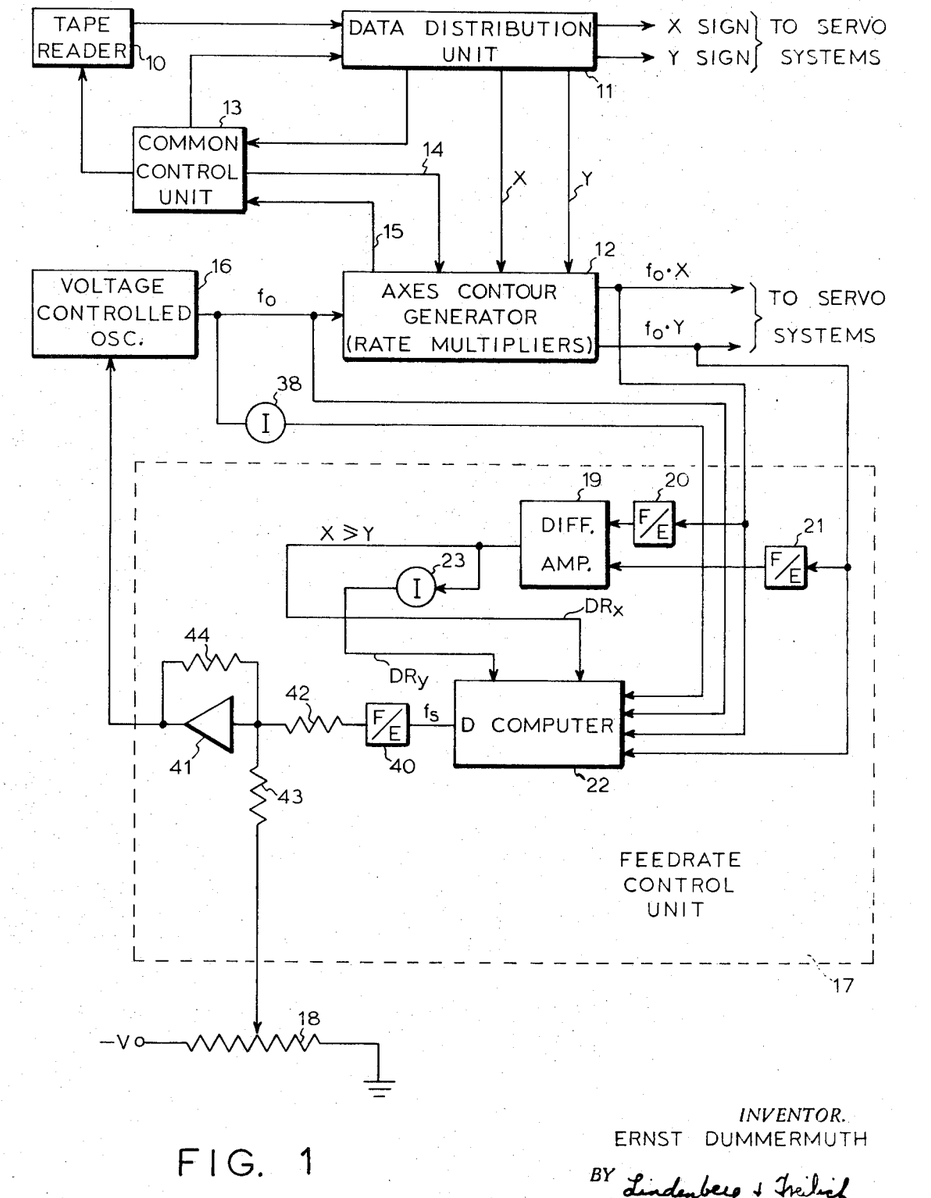
FIG. 1 is a block diagram of one embodiment of the present invention where machine tool velocity is being maintained constant for all programmed motions.

In a preferred embodiment of the invention as shown in FIG. 1, axis command data is stored in, for example, punched paper tape as departure distances along control axes X, Y and Z. Other control data may be also stored and read with the departure data by a tape reader 10.

A data distribution unit 11 converts the output signals from the tape reader 10 into data compatible with the system. After various checks are performed on the data to insure reliability, the data is distributed to an axis contour generator 12 and a common control unit 13 where the distributed data is temporarily stored in buffer registers. In that manner, while the command data for a given departure D of a machine tool is being processed by the axis contour generator 12 under control of the unit 13, the tape reader 10 and data distribution unit 11 may be prepared for reading out and distributing the next command data.

The common control unit 13 directs the processing of all commands and causes the system to respond accordingly, all in accordance with practices which have become standard in numerical control systems. The axis contour generator 12 receives a signal from the unit 13 over a line 14 to initiate a command cycle. After the contour generator 12 has completed the command cycle, an "end carry" signal is transmitted over a line 15 to indicate to the common control unit 13 that the cycle has been completed, again all in accordance with practices which have become standard for numerical control systems.

A feedrate control unit 17 controls the frequency of the oscillator 16 to maintain the velocity of the machine tool at a constant value. That value may be varied within limits by a potentiometer 18. For convenience, a two-axes control system is illustrated. Accordingly, only pulse trains $f_o \cdot X$ and $f_o \cdot Y$ are indicated as outputs from the contour generator 12 to X and Y servo systems for control of the machine tool (not shown). In that manner, the axis contour generator 12 functions as a conventional linear interpolator to meter pulses to all axes simultaneously in accordance with the departure D dimensions (X and Y values) programmed.

The X and Y pulses are metered to the servo systems at a rate to assure completion of the programmed move during a command cycle, using the pulse train from the voltage controlled oscillator 16 to determine the time base. That is accomplished by using the rate multipliers of the axis contour generator 12 to also count out a predetermined number of pulses to the cycle so that the cycle time is inversely proportional to the frequency $f_o$ of the input pulse train thereto. This assures the proper cycle time and a synchronized motion of all axis servo systems to produce motion of the controlled tool at a constant velocity.

The servo systems convert the metered pulses into a proportional voltage or current to operate prime movers of the machine tool in response to the difference between a machine tool position feedback signal and the voltage or current signal derived from the metered pulses. The motion of the prime movers will then be in a direction to reduce the difference, as is the standard practice in servo systems. The direction of the motion produced in a given axis is determined by the sign of the axis command. That is represented in FIG. 1 by X and Y sign signals transmitted by the data distribution unit 11 to the respective servosystems.

The metered pulses from the axis contour generator 12 are also transmitted to the feedrate control unit 17 in order that the voltage controlled oscillator 16 may be varied to produce an output pulse train at a frequency $f_o$ which will result in the desired machine tool velocity regardless of the departure programmed. For example, if the command data calls for a departure D along only the X axis, the Y-command is equal to zero and the frequency $f_o$ from the voltage controlled oscillator set by the potentiometer 18 will be multiplied by X to produce the metered pulses $f_o \cdot X$ which will result in the machine tool being moved along the X axis the specified departure D at the desired velocity.

In summary, the numerical control system is based upon pulses such that each pulse will produce a predetermined departure along a given axis (for example 0.0001 inch). The axis contour generator 12 meters a sufficient number of pulses to produce the programmed departure of the machine tool in such a manner as to satisfy the equation:

$$V \cdot T = D$$

where $T$ is the cycle time for departure $D$ at the desired velocity $V$. The task then of the feedrate control unit 17 is to keep the departure velocity of the two-axes contouring system constant within a certain range independent of the magnitude of the X and Y departure commands. In the past it has been the practice to maintain the departure velocity constant only along a single axis, that axis being selected for the largest axis command as noted hereinbefore. For example, if the command data calls for a departure of 5 inches along the X axis and 10 inches along the Y axis, the velocity of the machine tool along the Y axis is maintained constant. However, the vector sum of the X and Y velocities of the machine tool is then in error by 12 percent. That error increases as the difference between the X and Y commands decreases to a maximum of 41.4 percent error when the X and Y axis commands are equal. This error is substantially reduced in accordance with the present invention by controlling the oscillator 16 by taking both axis commands into account in approximating the departure D to be produced by the X and Y commands such that the equation $V \cdot T = D$ is more nearly approximated.

In taking both axes into account, the error could be reduced to zero by setting D, the control on the oscillator 16, equal to the square root of the sum of the separate axis commands squared. However, as noted hereinbefore, the algorithms for squaring the axis commands obtaining the sum of the squares, and then solving for the square root of the sum is involved and would require a substantial amount of hardware and time. Accordingly, in accordance with the present invention, the departure D is approximated by an algorithm in accordance with equation (2).

The following table compares the resultant error of the prior art method of controlling velocity with the present invention. In the first two columns the X and Y commands are given for eleven ratios from 1:0 to 1:1. The third column gives the true vector-sum departure D of the machine tool produced by the axis commands. The fourth column gives the approximated departure D of the machine tool by the technique of the present invention. The fifth column shows the percent error of the approximated departure D from the true departure given in the third column. Since the prior art method would assume for all cases that the departure D of the machine tool is equal to unity for the ratios given in the table, the percent error of the prior art technique is as shown in the last column of the table.

| Command | | True D | Approx. D | % Error | % Error |
|---|---|---|---|---|---|
| X | Y | $\sqrt{X^2+Y^2}$ | X+½Y | X+½Y | Prior Art |
| 1 | 0 | 1 | 1 | 0 | 0 |
| 1 | 0.1 | 1.005 | 1.05 | −4.5 | +0.5 |
| 1 | 0.2 | 1.02 | 1.1 | −7.85 | +2 |
| 1 | 0.3 | 1.045 | 1.15 | −10 | +4.5 |
| 1 | 0.4 | 1.077 | 1.2 | −11.4 | +7.7 |
| 1 | 0.5 | 1.12 | 1.25 | −11.6 | +12 |
| 1 | 0.6 | 1.168 | 1.3 | −11.3 | +16.8 |
| 1 | 0.7 | 1.22 | 1.35 | −10.65 | +22 |
| 1 | 0.8 | 1.281 | 1.4 | −9.28 | +28 |
| 1 | 0.9 | 1.346 | 1.45 | −7.73 | +34.6 |
| 1 | 1 | 1.414 | 1.5 | −6.08 | +41.4 |

A similar table may be set forth for corresponding ratios when Y is greater than X by simply interchanging X and Y in the first two columns.

In carrying out this technique for approximating the departure D as a function of the axis commands X and Y, it is first necessary to determine whether X is equal to or greater than Y. That is accomplished by a differential amplifier 19 in the feedrate control unit 17 which receives voltage signals proportional to the pulse trains $f_o \cdot X$ and $f_o \cdot Y$ via respective frequency-to-voltage converters 20 and 21. If X is greater than Y, the pulse train $f_o \cdot X$ will have a frequency greater than the pulse train $f_o \cdot Y$. Accordingly, the voltage output of the converter 20 will be greater than the voltage output of the converter 21. The differential amplifier then transmits a control signal DRx for control of a D-computer 22 which produces a train of pulses of a frequency equal to $f_o(X+0.5Y)$. If Y is greater than X, the output of the differential amplifier will be substantially zero volts, thereby inhibiting the transmission of a DRx control signal to the D-computer 22. Instead, the differential amplifier 19 transmits to the computer 22 a DRy control signal via an inverter 23.

Figure 2:
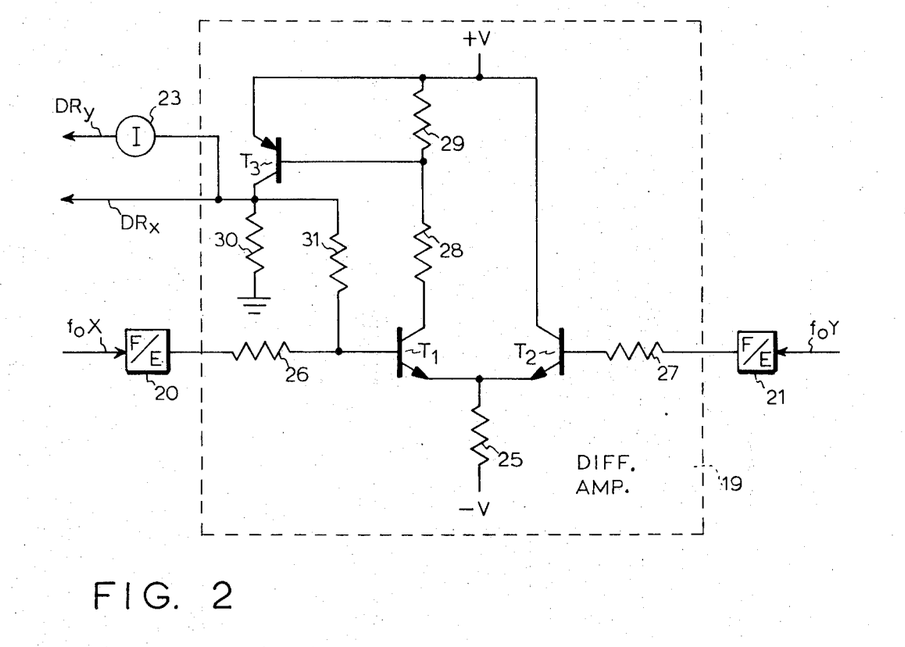
FIG. 2 is a circuit diagram of a differential amplifier employed in the embodiment of FIG. 1.

A circuit diagram for the differential amplifier 19 is shown in FIG. 2 as comprising a pair of NPN-transistors $T_1$ and $T_2$ having a common emitter resistor 25. The base electrodes of the respective transistors $T_1$ and $T_2$ are connected to the frequency-to-voltage converters 20 and 21 by resistors 26 and 27. The collector of the transistor $T_2$ is connected directly to the power supply while the collector of the transistor $T_1$ is connected to the power supply by voltage dividing resistors 28 and 29. A PNP-transistor $T_3$ is connected with its base-emitter junction across the resistor 29 to provide a single-ended output from the differential amplifier. If X is equal to or greater than Y, the output voltage from the frequency-to-voltage converter 20 is equal to or greater than the voltage from the converter 21 so that only the transistor $T_1$ will conduct thereby turning the transistor $T_3$ on. The control signal DRx is then derived across a load resistor 30. If Y is greater than X, the transistor $T_2$ conducts, thereby turning off the transistor $T_1$ and the transistor $T_3$ so that the DRx control signal goes to zero volts. The inverter 23, which may comprise another transistor, then provides a positive voltage for the control signal DRy. A feedback resistor 31 connected from the collector of the transistor $T_3$ to the base of transistor $T_1$ provides a hysteresis which will assure that the differential amplifier latches in one state whenever X is equal to Y; which state is of no importance since $$|X|+|0.5Y|=|Y|+|0.5X| \text{ if } |X|=|Y|$$

thereby preventing an undefined condition when X is equal to Y.

Figure 3:
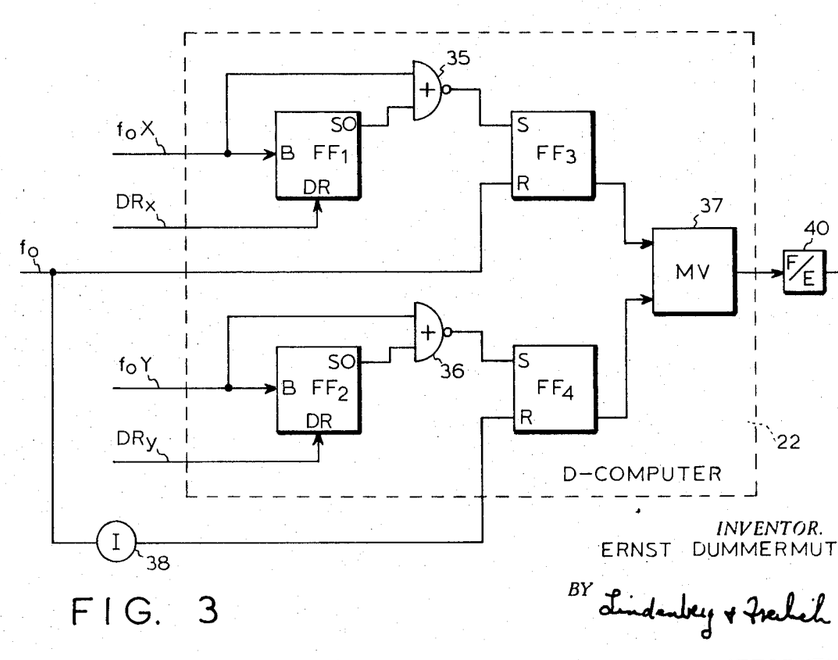
FIG. 3 is a logic diagram of apparatus used in the system of FIG. 1 for approximating the departure (scalar quantity of the vector sum) D of axis commands X, Y and Z, and for producing a voltage signal proportional to $D$.

The D-computer 22 will now be described with reference to the logic diagram of FIG. 3. It comprises a pair of control flip-flops $FF_1$ and $FF_2$ which have their respective direct reset terminals (DR) connected to receive the control signals DRx and DRy. If X is equal to or greater than Y, the flip-flop $FF_1$ will always remain reset thereby enabling a NOR-gate 35 to transmit every $f_o \cdot X$ pulse received at a binary input terminal (B) thereof from the axis contour generator 12 (FIG. 1). The binary flip-flop $FF_2$ has its direct reset input terminal (DR) connected to receive the control signal DRy which is at zero volts when X is equal to or greater than Y. Accordingly, the binary flip-flop $FF_2$ will respond to every $f_o \cdot Y$ pulse received at a binary input terminal (B) thereof from the contour generator 12 to provide at its set output terminal (SO) a square wave of half the frequency of the pulse train $f_o \cdot Y$. A NOR-gate 35 (connected to the set output terminal of the binary flip-flop $FF_2$ and to the contour generator 12 to receive the train of pulses $f_o \cdot Y$) will then transmit only half of the pulses in the train $f_o \cdot Y$.

Buffer flip-flops $FF_3$ and $FF_4$ are connected to a monostable multivibrator 37 so that it is triggered when either the flip-flop $FF_3$ or the flip-flop $FF_4$ is reset by a pulse at its input terminal R. One of the flip-flops, such as the flip-flop $FF_3$, is reset directly by the output $f_o$ of the voltage controlled oscillator 16 (FIG. 1) while the other flip-flop $FF_4$ is reset by the delayed and 180° phase shifted output of the voltage controlled oscillator 16. In that manner, the pulse train from the monostable multivibrator 37 will have an output frequency proportional to $|X|+|0.5Y|$. The delayed output from the voltage controlled oscillator 16 may be obtained by, for example, providing an inverter element 38 between the output terminal of the voltage controlled oscillator and the reset input terminal of the buffer flip-flop $FF_4$.

If the absolute value of the Y command is greater than the absolute value of the X command, the roles of the binary flip-flops $FF_1$ and $FF_2$ are reversed such that the gate 36 transmits every $f_o \cdot Y$ pulse while the gate 35 transmits only every other $f_o \cdot X$ pulse. In that manner, the output of the D-computer 22 is a pulse train proportionate to $$|X|+|0.5Y| \text{ or } |Y|+|0.5X|$$

A frequency-to-voltage converter 40 converts the train of pulses from the D-computer 22 into a proportional voltage or current which is coupled to an operational amplifier 41 (FIG. 1) by a resistor 42. The potentiometer 18 is connected to the summing junction of the operational amplifier 41 by a resistor 43 of typically 100K ohms; the potentiometer 18 is then typically 2K ohms. The output of the operational amplifier 41 is connected to the control terminal of the voltage controlled oscillator 16 which may be of any conventional type such as a charge controlled astable multivibrator. In that manner, a closed loop analog system is provided for controlling the output frequency $f_o$ of the voltage controlled oscillator 16 as a function of the desired machine tool departure D, where D is approximated as just described.

It should be noted that since the same oscillator 16 which drives the axis contour generator 12 to the X and Y commands is used to reset the flip-flops $FF_3$ and $FF_4$ sequentially, the 0.5Y-pulses (0.5X-pulses) are added exactly between two X-pulses (Y-pulses) if the oscillator 16 is selected to have a 50 percent duty cycle. Therefore, the output $f_o$ (X+0.5Y) or (Y+0.5X) has uneven spacing between pulses and the frequency-to-voltage converter 40 will generate a lower voltage than it would with even spacing if conventional frequency-to-voltage converters are employed, such as a converter using an integrating capacitor and a discharge path having a predetermined RC time constant. The foregoing table of errors assumes even spacing between pulses. Consequently, the actual error is less than the error indicated. For example, if X=1 and Y=0.5, the actual error measured is −9.75 percent rather than −11.6 percent. It should also be noted that the error is always negative which means that the machine tool velocity will always be slightly less than the desired velocity so that the system may be safely programmed for the maximum velocity for a given tool and material combination. In other words, the error inherent in the system for approximating the distance D will provide a margin of safety for programming (i.e., setting through the potentiometer 18) the system velocity. The maximum velocity is then achieved only when the tool displacement is along one of the command axes (i.e., when either X or Y is equal to 0).

The axis contour generator 12 which produces the pulse trains $f_o \cdot X$ and $f_o \cdot Y$ for the production of such motion of the machine tool may, in practice, be a linear interpolator of the type normally used in numerical control systems such that the output frequency $f_o$ from the oscillator 16 (which through the feedrate control unit 17 sets up the velocity factor for the numerical control system) will produce trains of pulses $f_o \cdot X$ and $f_o \cdot Y$ at frequencies that will assure obtaining the desired departure of the machine tool along particular axes where each pulse is weighted to produce a motion of a predetermined dimension. In other words, the voltage controlled oscillator 16 and feedrate control unit 17 function together as a feedrate generator to provide a pulse train that sets the maximum velocity. A given number of pulses (such as 10,000) define a cycle. Therefore, the cycle time is a function of the frequency $f_o$ and the frequency $f_o$ imposes a maximum limit of motion (such as 1 inch per cycle of 10,000 pulses, each pulse being weighted to produce a motion of 0.0001 inches). Accordingly, to obtain the desired departure along a particular axis, the contour generator must multiply the pulse train $f_o$ by the axis command. This means, for example, that for a command of 0.2222 inches, a pulse train of 2,222 pulses must be metered out during the cycle of 10,000 pulses. This is equivalent to multiplying the 10,000 pulses of the train from the oscillator 16 by the fraction 2,222 over 10,000. This multiplication is accomplished by the axes contour generator 12 comprising a multiplier having a counter which counts pulses of the frequency $f_o$ and gates which respond to the axis commands to meter out from appropriate stages of the counter pulses at different frequencies which, upon being combined through a buffer gate, will constitute the desired number of metered pulses. It should be noted that the counter will count all 10,000 pulses from the oscillator 16 even though less than 10,000 pulses will be transmitted to the X and Y servosystems. When the count of 10,000 is reached, an "end carry" signal from the counter over the line 15 signifies to the common control unit 13 that the cycle has been completed. In that manner, the cycle of a given command has a time period which is a function of the tool velocity which is to be maintained constant within a limited range of error, and the magnitude of X and Y.

Figure 4:
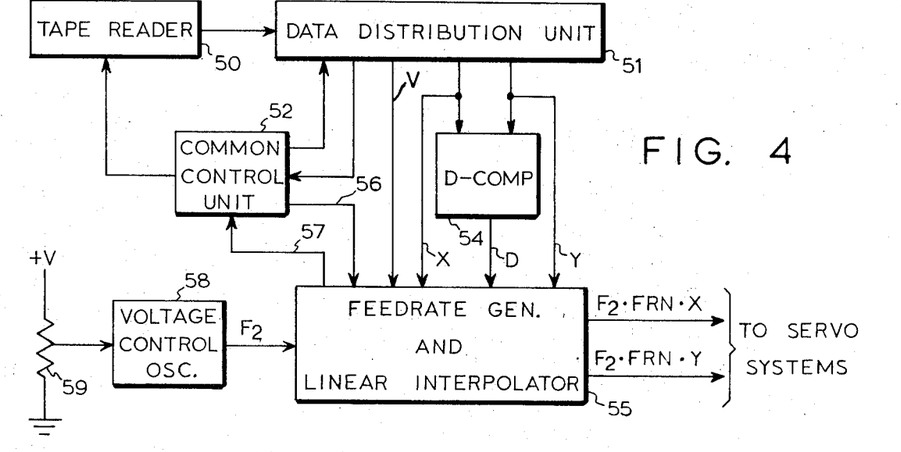
FIG. 4 is a block diagram of another embodiment of the present invention wherein velocity is specified as part of the axis command data read from a tape.

Referring now to FIG. 4, another embodiment of the present invention will be described in which velocity is specified as part of the axis command data read by a tape reader 50. A data distribution unit 51 and common control unit 52 function in the same manner as the system described with reference to FIG. 1. The velocity value is transmitted directly to a feedrate generator and linear interpolator 55 while a departure value D is provided by X and Y commands through a D-computer 54 which approximates the departure according to equation (2) or such other approximation as will reduce the error without involving an algorithm which approaches the complexity of the algorithm for obtaining the true departure D by calculating the square root of the sum of the squares of the axis commands. However, it should be understood that in its broadest aspects, the feature of calculating the feedrate number in accordance with the present invention may be employed to advantage in a system where the true value of the departure D is determined and so entered.

The common control unit 52 initiates a cycle by resetting the feedrate generator and linear interpolator 55 over a line 56. The latter meters out pulses to X and Y servosystems at a rate which assures obtaining the desired departure of the machine tool along the specified axes with a vector-sum velocity V. When the cycle has been completed, and "end carry" signal is transmitted over a line 57 to the common control unit 52 which then initiates processing the next command data.

An oscillator 58 transmits a clock signal at a frequency $F_2$ to the feedrate generator and linear interpolator 55, the feedrate generating function of which is to compute a velocity factor referred to as a feedrate number (FRN) by which the frequency $F_2$ is to be multiplied. The linear interpolating function is then not only to produce the "end carry" signal after counting a given number (such as 10,000) of pulses at a frequency $F_2 \cdot FRN$ but to also multiply the pulse train at that frequency $F_2 \cdot FRN$ by the X and Y commands to obtain the trains of pulses $F_2 \cdot FRN \cdot X$ and $F_2 \cdot FRN \cdot Y$. A potentiometer 59 is provided to set the constant frequency $F_2$.

Before describing the feedrate generator and linear interpolator 55 with reference to FIG. 5, the prior art systems will first be described. They store a feedrate number (FRN) which reflects the value of the departure D according to the equation $V=FRN \cdot D$, instead of storing the desired velocity V for a given departure. In their simplest form, such prior art systems consist of a rate multiplier for multiplying a clock frequency F by a feedrate number generally consisting of three decimal digits. Accordingly, the rate multiplier is comprised of cascaded decimal rate counters with outputs gated by the feedrate number stored in a static register. The gated pulses are then combined through a buffer gate to provide a train of pulses at a frequency $F \cdot FRN$. That train of pulses will define the feedrate. Accordingly, the rate multiplier for the feedrate number may be denominated a feedrate generator, the output of which is transmitted to a linear interpolator comprising rate multipliers (similar to a rate multiplier of the feedrate generator) with the X and Y commands as multiplier inputs. The output of the linear interpolator is then a pulse train at a frequency proportionate to the feedrate number which reflects the value of the departure D according to the equation $V=FRN \cdot D$. In other words, the feedrate number cannot be stored in the prior art systems as part of the program until the tool velocity has been selected and the departure D is computed. By the present invention, only the velocity V need be selected; the departure D is then approximated (or computed exactly if desired) on line. From that data (V and D), the feedrate number is calculated.

Figure 5:
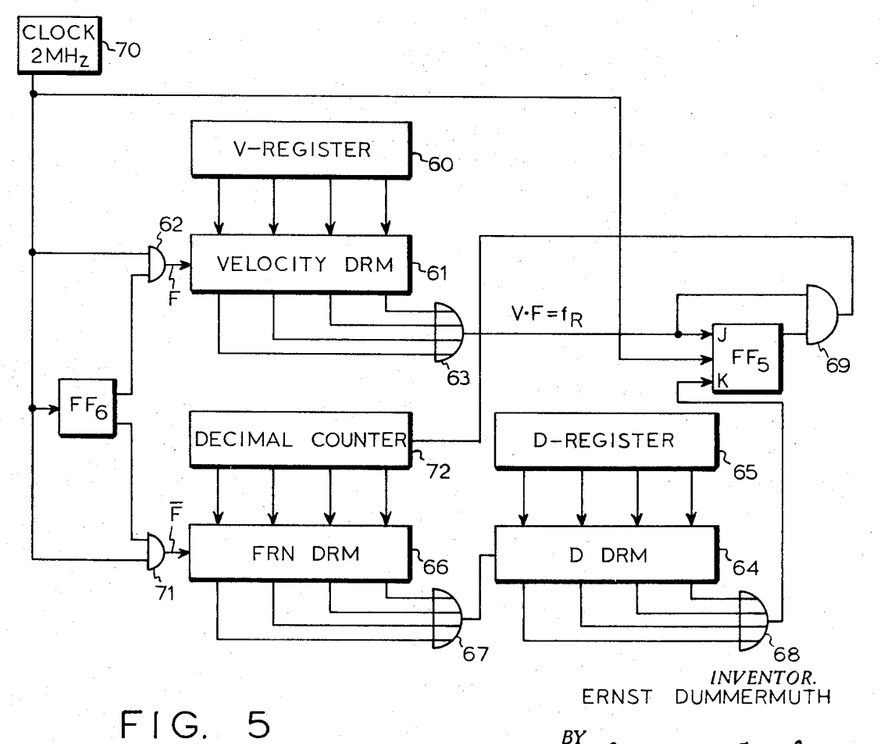
FIG. 5 is a more detailed block diagram of apparatus used in the system of FIG. 4 for computing a feedrate number (FRN) from an approximated departure D and velocity V according to the equation $F \cdot V = F \cdot Q \cdot D$ where $Q$ is a variable increased from zero until the equation is satisfied at which time $Q$ is the desired FRN.

Referring to FIG. 5, the feedrate generator and linear interpolator 55 of the system shown in FIG. 4 will now be described. Velocity V (not related to any departure information) is read by the tape reader 50 (FIG. 4). The data distribution unit 51 then transmits the velocity information as a four digit decimal number to the feedrate generator and linear interpolator 55 (FIG. 4) where it is stored in a V-register 60 (FIG. 5) for use as a multiplier in a velocity decimal rate multiplier (DRM) 61 which is supplied a clock input at frequency F through an AND-gate 62 so that the output frequency from a buffer gate 63 is directly proportional to the desired velocity. That frequency which is equal to V·F is then employed to calculate the feedrate number (FRN) from the departure $D$ entered from the computer 54 of FIG. 4, where $D$ is approximated to be equal to $|X|+|0.5Y|$ if $X$ is equal to greater than $Y$ and $|Y|+|0.5X|$ if $Y$ is greater than $X$.

The computation of $D$ is readily implemented by storing the X and Y data in static registers, making a static comparison, and in response thereto enabling one of two banks of gates which will transfer the larger one into the D-register. Assume $X \geq Y$, then $X$ will be transferred into the $D$ register and then $0.5Y$ will be added to the contents of the D-register. Alternatively, $D$ may be formed by the computer 54 of FIG. 4 in the D-register 65 by providing four cascaded decimal counters for the D-register 65, where each decade can be loaded in serial form. Then, assuming $X$ is .7321 and $Y$ is .6951, the $D$ number is generated as follows: send 7 pulses into decade 1, 3 pulses into decade 2, 2 pulses into decade 3, and 1 pulse into decade 4. Now $|X|$ is loaded. To add $|0.5Y|$ do the following: send 6/2=3 pulses into decade 1; 9/2=4 pulses into decade 2 and 5 pulses into decade 3; 5/2=2 pulses into decade 3 and 5 pulses into decade 4; ½=0 pulses into decade 4. As can be observed, any even number can be divided by 2 without remainder; however, an odd number divided by 2 leaves a remainder which requires a correction of 5 pulses into the next lower decade. The result in $D$ is now $|X|+|0.5Y|$. Still another alternative would be to convert each of the decimal numbers for the $X$ and $Y$ commands into true binary coded numbers so that $Y$ may be conveniently divided by 2 by simply shifting the $Y$ command one position in the direction of the least significant digit position, thereby forming $0.5Y$ before adding $X$ and $0.5Y$.

The feedrate number (FRN) is calculated, or more properly generated, to satisfy the equation $V=FRN \cdot D$ by applying to a decimal rate multiplier 66 for the FRN number a clock pulse of the same frequency as the clock pulse applied to the velocity rate multiplier 61. The output of the rate multiplier 66 is applied to the $D$ rate multiplier 64 through a buffer gate 67. The frequency applied to the $D$ rate multiplier 64 is then proportional to the multiplier of the FRN rate multiplier, which is the number then being stored by the decimal counter 72. That frequency is then multiplied by the departure value $D$ in the D-register 65 through the $D$ rate multiplier 64. If the proper multiplier has been applied to the FRN rate multiplier 66, the output of the $D$ rate multiplier 64 combined through a buffer gate 68 will be equal to the frequency of the output from the buffer gate 63. That condition of equality is detected by an anticoincidence circuit comprising a JK flip-flop $FF_5$ and an AND-gate 69.

The clock pulses applied to the velocity rate multiplier 61 and the FRN rate multiplier 66 are controlled to be 180° out of phase at a frequency of 1 MHz by a binary flip-flop $FF_6$ triggered at a rate of 2 MHz by clock pulses from a source 70. The complimentary output of the flip-flop $FF_6$ then enables the AND-gate 62 to transmit every other pulse from the clock source and an AND-gate 71 to transmit alternate pulses from the clock source 70 out of phase with the clock pulses being transmitted by the AND-gate 62. Accordingly, pulses at the J and K input terminals of the flip-flop $FF_5$ cannot appear simultaneously.

Initially, the multiplier for the FRN rate multiplier 66 stored in a decimal counter 72 is zero so that no pulses are being transmitted through the buffer gate 68 to the K input terminal of the flip-flop $FF_5$ since the product FRN·$D$ is then equal to zero. Therefore, the first pulse at the J input terminal sets the flip-flop $FF_5$ and all subsequent pulses transmitted by the buffer gate 63 pass through the AND-gate 69 to the decimal counter 72 thereby increasing the number stored therein, which may be denominated $Q$, from 0 to some finite value. The FRN rate multiplier 66 will then immediately begin to transmit pulses through the buffer gate 67 for multiplication by the departure value D stored in the register 65 by the $D$ rate multiplier 64. The first pulse transmitted through the buffer gate 68 from the $D$ rate multiplier 64 will reset the flip-flop $FF_5$. Consequently, the next pulse from the buffer gate 63 will not pass through the AND-gate 69 but will set the flip-flop $FF_5$ again. If the frequency of the pulses being transmitted by the buffer gate 63 is greater than the frequency of the pulses being transmitted by the buffer gate 68, then the difference of the two frequencies passes through the AND-gate 69 to increase the value $Q$ in the decimal counter 72.

Ultimately, the value $Q$ in the decimal counter 72 is increased sufficiently to allow the frequency of the pulses transmitted through the buffer gate 68 to equal the frequency of the pulses transmitted through the buffer gate 63 at which time the flip-flop $FF_5$ is toggled (alternately set and reset) without allowing any more pulses from the buffer gate 63 to be transmitted by the AND-gate 69. At that time, the equation $V=FRN \cdot D$ is satisfied so that the value $Q$ stored in the decimal counter is the desired feedrate number (FRN) for the specified velocity $V$ and the calculated departure $D$. Accordingly, the output from the decimal counter 72 then being applied to the FRN rate multiplier 66 may be gated as an FRN multiplier to a conventional feedrate generator where a clock pulse train at a frequency of, for example, 166.66 kHz. is multiplied by the feedrate number to set up the velocity factor for the numerical control system. The output pulse train from that rate multiplier is then transmitted to a conventional linear interpolator comprising X and Y rate multipliers in the configuration illustrated in FIG. 6 (which shows a variant of the apparatus shown in FIG. 5).

Figure 6:
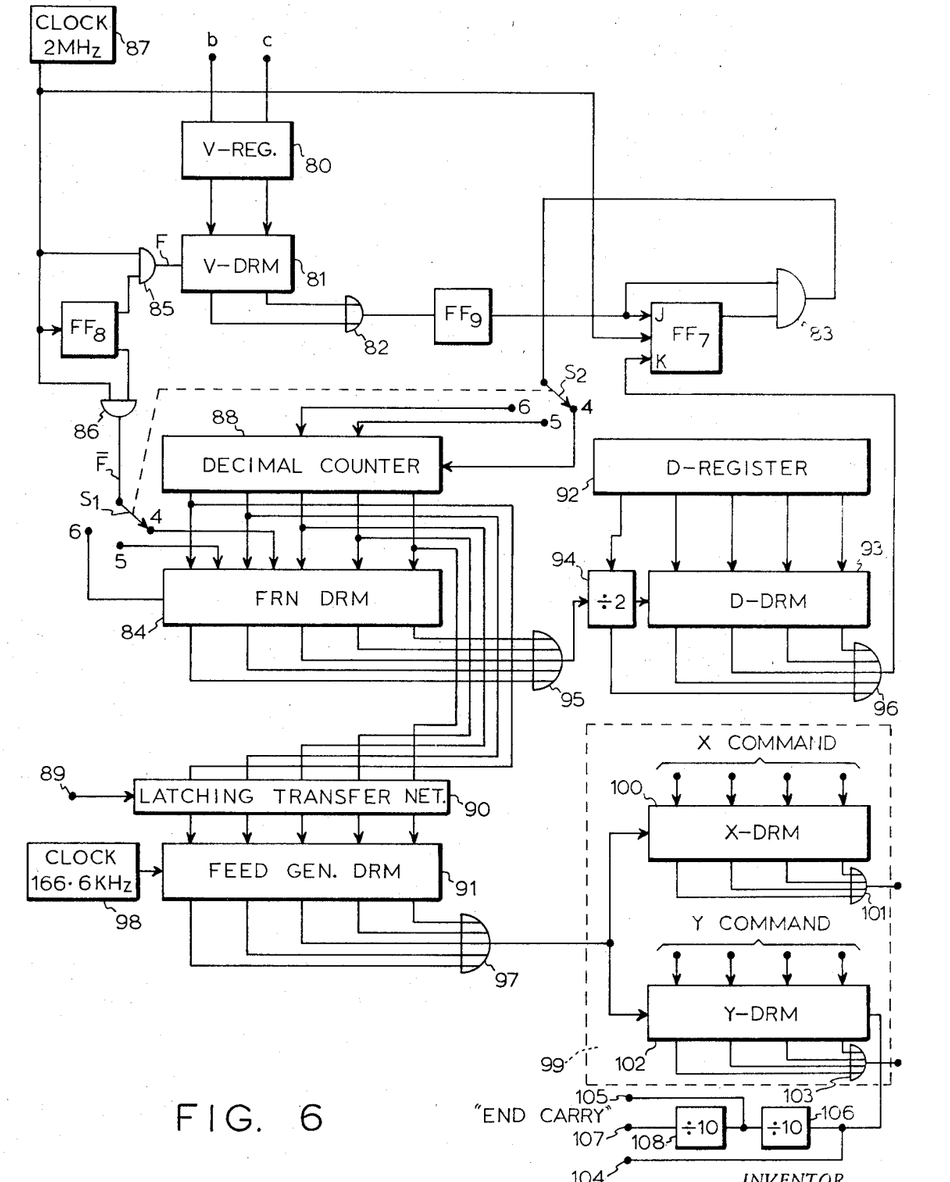
FIG. 6 is a variant of the apparatus shown in FIG. 5 to allow the velocity $V$ to be specified by the EIA "magic three" code.

As noted hereinbefore, the feedrate generator must furnish at least as many pulses as are required for the maximum programmable move per machine cycle. If the maximum programmable move per block of instructions is 0.9999 inch, the number of pulses required to complete the move is 9,999. For convenience, 10,000 pulses may be selected as the standard number per block or machine cycle. Accordingly, the X and Y rate multipliers of the linear interpolator may each contain four decade counters in cascade that count out 10,000 pulses and terminate the cycle by producing an "end carry" signal or, as shown in FIG. 6, four decade counters in cascade with further decade counters cascaded with one command rate multiplier, each dividing by 10, to allow selecting a time base of $10^4$, $10^5$, or $10^6$ pulses per cycle, thereby scaling up X and Y commands given as decimal fractions to values greater than one. If the velocity should be kept constant for moves less than 0.1 inch, it would be desirable to select a time base of $10^3$, which can be done by selecting the "end carry" signal from the third decade of the axis rate multipliers. With such an arrangement the velocity can be kept constant with moves from 0.01 inches to 99.99 inches.

Referring now to the embodiment of FIG. 6, the velocity information read from the punched paper tape is in the "magic three" code $f(abc)$ wherein the first digit "$a$" is an exponent for a multiplier $10^{a-3}$, and the last two digits $b$ and $c$ is a decimal fraction $(.bc)$ in inches per minute. The decimal fraction $(.bc)$ is stored as the velocity data in a register 80 and applied as a multiplier to a velocity rate multiplier 81 so that the frequency of a pulse train at the output of a buffer gate 82 is $F(.bc)$, which is not equal to $F \cdot V$ as for the output of gate 63 in FIG. 5. For the anticoincidence circuit comprising a flip-flop $FF_7$ and an AND-gate 83 to function for the same purpose as the corresponding circuit in FIG. 5, it is then necessary to divide the frequency in the lower channel by $10^{a-3}$ to compensate for only the decimal fraction $(.bc)$ of the velocity being entered in the upper channel. That is accomplished by including more decades in an FRN rate multiplier 84 than in the velocity rate multiplier 81 and shifting the clock pulse train applied thereto to a different cascaded decimal counter. The number of decades shifted is in each case selected to be equal to $a-3$.

In this illustrative embodiment, the difference ($a-3$) must be equal to at least one since the velocity rate multiplier 81 has two decades for the two digit decimal fraction (.$bc$) and the feedrate number is specified to be a three digit number. Accordingly, the first digit of the "magic three" code must be equal to at least 4. If equal to that number, a switch $S_1$ is set to connect a pulse train of frequency $\bar{F}$ (where the bar denotes a 180° phase relation with the pulse train to the velocity rate multiplier 81) to the third from last decade in the FRN rate multiplier 84, as shown, thereby dividing the output of the lower channel by 100. If the digit $a$ is equal to 5, the switch $S_1$ is moved to the position "5" to include one more decade in the FRN rate multiplier 84, thereby dividing by 10. For the digit $a$ equal to 6, the switch is moved one more position over to divide by 1. More decades and switch positions may be included, but a range of 4 to 6 for the digit $a$ provides an adequate range for velocity from 0.1 inch per minute to 990 inches per minute.

It should be noted that the pulse trains at the frequencies F and $\bar{F}$ are provided by a flip-flop $FF_8$ and AND-gates 85 and 86 from a clock pulse source 87, just as in the embodiment of FIG. 5. The principal difference between the two embodiments is only the form in which the velocity data is expressed and the manner in which it is entered. This manner of entry need not be employed, however, since a code converter could be provided to convert the velocity data from the "magic three" code to a four digit number, in which case the embodiment of FIG. 5 would be employed.

A switch $S_2$ is ganged with the switch $S_1$ in order that the pulse train from the AND-gate 83 to a decimal counter 88 always be switched to a decade counting stage thereof that is offset from the frequency input to the FRN rate multiplier 84 by three decades. This is so that the feedrate number generated in the counter 88 will always be three digits, rather than four as in FIG. 5.

In the usual numerical control system, it will take a maximum of 4 milliseconds for the feedrate number to be generated after the X and Y commands are read into intermediate storage (i.e., into registers in the computer 54 of FIG. 4) and the "magic three" code has been registered. The common control unit 52 synchronized and initiates the FRN generation process by resetting all binary elements of the system of FIG. 5 through initial reset circuits (not shown). After the FRN number is generated, it can be transferred into the feedrate generator 91 whenever the previous block is completed and a data transfer into the rate multipliers 91, 100, 102 is requested. The contents of the decimal counter 88 are then entered into latching network 90. The five decade rate multipliers 91 then function as a feedrate generator.

It should be noted that although the switches $S_1$ and $S_2$ are shown as mechanical switches (which could be stepping switches actuated by a solenoid in response to a number of pulses equal to $a-3$), in practice the switches would be electronic switches in order that the time to enter the velocity data be less than the time (4 milliseconds) required to generate the feedrate number. Such electronic switching arrangements may be readily provided with transistors, such as in a dual selecting-tree arrangement.

In generating the feedrate number, the value D entered into a D register 92 is computed as described hereinbefore. The difference between a D rate multiplier 93 and the corresponding rate multiplier of FIG. 5 is that an input binary rate multiplier 94 is included to accommodate an overflow of a decimal digit 1 when the value D is computed from $X$ and $Y$ values. For example, assuming $X=0.7321$ and $Y=0.6951$, since $X$ is the larger number, D is equal to $0.7321+(0.5)\,0.6951$ which is equal to $1.0796$. The carry of 1 to the left of the decimal point requires the D register should be provided with another (fifth) decade to store the overflow. However, since $X$ and $Y$ will always be decimal fractions, the overflow can never be greater than one so a single binary stage will do for the fifth decade in the $D$ register. The corresponding binary stage 94 at the input of the D rate multiplier then allows pulses from a buffer gate 95 to be divided by 2. Then, if a decimal one digit is stored in the most significant digit position of the D register, pulses thus divided by two are transmitted to a buffer gate 96 as part of the train of pulses representing the product $Q \cdot F \cdot D$, where Q is the number currently stored in the counter 88. Since the lower channel now has an additional binary divider in the binary stage 94, a compensating stage must be included in the upper channel. That is accomplished by including a binary flip-flop $FF_9$ in the upper stage. If the additional stage 94 were a full decade, then the compensating stage in the upper channel would also be a full decade.

The feedrate generator which comprises the decimal rate multiplier 91 and buffer gate 97 receives pulses at a constant frequency (166.6 kHz.) from a source 98 and transmits pulses at a frequency proportional to the feedrate number generated to a conventional linear interpolator 99 comprising a rate multiplier 100 and buffer gate 101 for a pulse train to the X axis servosystem, and a rate multiplier 102 and buffer gate 103 for a pulse train to the Y axis servosystem. Each of the rate multipliers 100 and 102 has four decades. Accordingly, the carry output from the most significant decade will indicate a count of 10,000 pulses at terminal 104 signifying "end carry" to complete a cycle. However, this cycle period is for X and Y commands less than 1 inch. For commands of 1 to 9.999 inches, it is necessary for the tape program to store the commands as decimal fractions and multiply the commands by 10 with a conventional $g$ (10) code. That may be accomplished by selecting the "end carry" signal at a terminal 105 from a cascaded decade counter 106. For example, a Y command of 9.9 inches is entered as $g$ (10) $X0.9900$. Commands of 1 to 99.99 inches are entered as $g$ (60) $X0.9999$ where $g$ (60) is a code to multiply by 100. That is done by selecting the "end carry" signal from still another terminal 107 at the output of a decade counter 108 cascaded with the counter 106.

For commands less than 0.1000, such as 0.0500 inch per minute, the commands should be normalized to eliminate leading zeros. In that manner 0.0500 inch would be inserted as 0.5000 inch. The i"end carry" signal should then be selected one decade sooner than the output terminal 104 to divide the interpolator output by 10. Again a program code could provide for that by using a conventional $g$ (11) code. Thus, by using these conventional $g$-codes, this system will keep vectorial velocity at the value designated for commands ranging from 0.01 to 99.99 inches.

The embodiments of FIGS. 1 and 4 have been described with reference to an approximation for $D$ equal to $X+0.5Y$ and $Y+0.5X$, according to whether or not $X$ is equal to or greater than $Y$. A closer approximating can be made by $D=|X|+|0.5Y|-|0.1X|$ if $|X|<|Y|$ and $|0.5Y|-|0.1X|$ is greater than zero; otherwise, D may be set equal to $|X|$ for a sufficiently close approximation. The following table shows the error resulting from the approximation.

| X | Y | $\sqrt{X^2+Y^2}$ | D | % Error |
|---|---|---|---|---|
| 1 | 0 | 1 | 1.0* | 0 |
| 1 | 0.1 | 1.005 | 1.0* | +0.5 |
| 1 | 0.2 | 1.02 | 1.0* | +1.97 |
| 1 | 0.3 | 1.045 | 1.05 | −0.48 |
| 1 | 0.4 | 1.077 | 1.10 | −2.15 |
| 1 | 0.5 | 1.12 | 1.15 | −2.7 |
| 1 | 0.6 | 1.168 | 1.2 | −2.75 |
| 1 | 0.7 | 1.22 | 1.25 | −2.5 |
| 1 | 0.8 | 1.281 | 1.30 | −1.5 |
| 1 | 0.9 | 1.346 | 1.35 | −0.3 |
| 1 | 1.0 | 1.414 | 1.4 | −1.0 |

*$|0.5Y|-|0.1X|$ is not greater than zero; therefore, $D=$

If Y is greater than X, then X and Y values are interchanged in the foregoing equation and table for D. This can be readily implemented in the computer 54 of FIG. 4 by simply shifting X (or Y) one decimal place to form $0.1X$ (or $0.1Y$). The subtraction of that value from $X+0.5Y$ (or $Y+0.5X$) is then performed by adding the complement of $0.1X$ ($0.1Y$). In the computer 22 of FIG. 1, the implementation can take the form of a decade counter connected to the output of gate 35 to form the value of $0.1X$. That output should then be connected to an anticoincidence circuit comprising the JK flip-flop $FF_5$ and AND-gate 69 (FIG. 5) with the J input terminal connected to the added counter and the K input terminal connected to the flip-flop $FF_4$ in the computer 22 of FIG. 3 to form the difference $0.5Y-0.1X$. It should be noted that the output of the anticoincidence circuit which is to be added to the value $X$ in the multivibrator 37 will be zero if $0.5Y-0.1X$ is less than zero so that the condition imposed for the first three cases of the foregoing table is satisfied, and $D$ is set equal to $X$. Of course, as­sumes $X$ is equal to or greater than $Y$; if not, the output of the added counter should be disabled by the signal DRy from the differential amplifier 19 (FIG. 1) so that $0.1X$ will be equal to zero. A second decade counter and anticoincidence circuit should then be added in a complementary manner for those conditions when $Y$ is greater than $X$. That second counter would be disabled by the signal DRx when $X$ is greater than $Y$.

Although only two-axes systems have been referred to as illustrative embodiments of the present invention, it should be appreciated that the various features may be employed in a three-axes system by simply taking the third axes into account where the feature to be employed depends upon approximating $D$. That may be done by simply adding $0.3Z$ for the approximation otherwise obtained by taking only two axes $X$ and $Y$ into account. This assumes that $X$ and $Y$ are greater than $Z$ and all other conditions are satisfied. In other words $$D \simeq |X|+|0.5Y|-|0.1X|+|0.3Z|, \text{ where } |0.5Y|-|0.1X|$$

is set equal to zero if $|0.5Y|-|0.1X|$ is equal to or less than zero, for the condition $$|X| \gtrsim |Y| \gtrsim |Z|$$

If that condition is not satisfied, the axis commands are interchanged according to their relative value. The result is better than ±5 percent of the correct value for $D$.

It should also be appreciated that novel features described with reference to the embodiments of FIGS. 5 and 6 do not depend upon $D$ being approximated since the exact value of $D$ may be entered if provision is made to determine the value of $D$ as the square root of the sum of the respective axis commands squared. It should also be recognized that although decimal systems have been referred to because the practice has been to prepare tapes in the decimal system of notation, i.e., in the BCD (binary coded decimal) system, all of the novel features described may be readily practiced in binary systems, even if program tapes are prepared in the decimal system of notation by using decimal-to-binary code converters in the data distribution unit. Accordingly, inasmuch as it is recognized that modifications and variations falling within the spirit of the invention will occur to those skilled in the art, it is not intended that the scope of the invention be determined by the disclosed exemplary embodiments, but rather should be determined by the breadth of the appended claims.

The embodiments of the invention in which an exclusive property or privilege is claimed are defined as follows:

1. In a numerical control system having a plurality of servosystems for controlling a tool position along a plurality of mutually perpendicular axes, each servosystem controlling said tool position in a different one of said axes, a method for obtaining wholly without human intervention a clock pulse train at a frequency which is a function of desired tool departure D, and in response thereto, obtaining departure pulses as a function of axis commands for each axis servosystem to move said tool at a predetermined velocity V, said method comprising:
   estimating said departure D from said axis commands;
   providing a train of pulses at a frequency which is a function of said velocity V and estimated departure D; and
   multiplying said train of pulses by said axis commands in pulse rate multipliers to obtain said departure pulses at a rate which provides said predetermined velocity V for the departure D.

2. A method as defined in claim 1 wherein said departure $D$ is estimated in accordance with the equations $$D=|X|+|0.5Y|-|0.1X| \text{ if } |0.5Y|-|0.1X| \geq 0$$

and $$D=|X| \text{ if } |0.5Y|-|0.1X|<0$$

the commands $X$ and $Y$ being interchanged in said equations if $|Y|>|X|$.

3. A method as defined in claim 2 wherein said departure $D$ is estimated for a three-axes system by adding $|0.3Z|$ to each estimated departure from $X$ and $Y$ commands, where all conditions are satisfied as for a two-axes system, and interchanging $X$, $Y$ and $Z$ such that, as interchanged, $|X| \gtrsim |Y| \gtrsim |Z|$.

4. A method as defined in claim 1 wherein said train of pulses is provided at a frequency which is a function of said velocity V and estimated departure D by obtaining a voltage signal proportional to said estimated departure D, and applying said voltage signal to a voltage controlled oscillator which provides said train of pulses.

5. A method as defined in claim 1 wherein said train of pulses is provided at a frequency which is a function of said velocity V and estimated departure D by calculating a feedrate number FRN from the relationship defined by the equation $V=\text{FRN} \cdot D$, and multiplying pulses from a clock pulse source by said number FRN.

6. In a numerical control system having at least $X$ and $Y$ servosystems, the combination comprising:
   reading means for reading from a stored program axis commands $X$ and $Y$ for a predetermined departure $D$ of a machine tool;
   a voltage controlled oscillator having a control terminal and an output terminal for producing a train of pulses at a frequency $f_o$ on said output terminal in response to a voltage signal;
   rate multiplier means connected to said reading means and said oscillator for producing departure pulses for said servosystems at frequencies $f_o \cdot X$ and $f_o \cdot Y$;
   comparing means responsive to said departure pulses for determining whether said product frequency $f_o \cdot X$ is greater than or equal to said product frequency $f_o \cdot Y$;
   dividing means responsive to said comparing means for dividing said product frequency $f_o \cdot Y$ by 2 if said product frequency $f_o \cdot X$ is greater than or equal to said product frequency $f_o \cdot Y$, and for dividing said product frequency $f_o \cdot X$ by 2 if said product frequency $f_o Y$ is greater than said product frequency $f_o X$;
   combining means responsive to said dividing means for combining in an interspaced manner pulses of the divided frequency product with pulses of the undivided frequency product, whereby a train of pulses is produced at a frequency $f_s$ in accordance with the Equation $f_s = f_0 |X| + |0.5Y|$ if $|X| \gtrsim |Y|$ and in accordance with the Equation $f_s = f_0 |Y| + |0.5X|$ if $|Y|>|X|$ and converting means responsive to said combining means for producing a voltage signal at said control terminal of said oscillator in response to said frequency $f_s$, whereby said frequency $f_o$ is a function of an approximated departure $D$ given by the equation $$D=|X|+|0.5Y| \text{ if } |X| \geq |Y|$$

and $$D=|Y|+|0.5Y| \text{ if } |Y|>|X|$$

7. The combination as defined in claim 6 wherein said dividing means comprises:
   a first binary circuit having a direct reset terminal connected to said comparing means, and a binary input terminal connected to said rate multiplier to receive said frequency product $f_oX$ and remain set continually when $f_oX \geq f_oY$, a second binary circuit having a direct reset terminal connected to said comparing means and a binary input terminal connected to said rate multiplier to receive said frequency product $f_oY$ and remain set continually when $f_oY < f_oX$, and first and second gates connected to transmit said frequency products $f_oX$ and $f_oY$, under control of said first and second binary circuits, respectively.

8. The combination as defined in claim 7 wherein said combining means comprises first and second flip-flops connected to be set by pulses transmitted by said first and second gates, respectively, and connected to be reset by said oscillator noncoincidentaly, and a multivibrator adapted to be triggered by said first and second flip-flops upon being reset.

9. In a numerical control system, the combination comprising:

first means for reading from a stored program data for a desired machine tool departure $D$ and a desired velocity $V$ for said departure $D$;

second means responsive to said first means for producing a first train of pulses at a frequency related to the product of a constant $F$ and said velocity $V$;

third means responsive to said first means for producing a second train of pulses at a frequency related to the product of said constant $F$, a number $Q$ and said departure $D$;

fourth means responsive to said second and third means for comparing said first train of pulses with said second train of pulses, and in response thereto, for producing a third train of pulses at a rate proportional to the difference in frequency between said first and second trains of pulses; and a counter for producing said number $Q$ in response to said third train of pulses to increase said second train of pulses to the frequency of said first train of pulses at which time $F \cdot V = Q \cdot D$, and $Q = FRN$, where FRN is a feedrate number equal to the ratio $V{:}D$.

10. The combination as defined in claim 9 wherein said tool departure data is read by said first means as axis commands $X$ and $Y$, and said third means includes means responsive to said axis commands for determining said departure $D$ from said axis commands.

11. The combination as defined in claim 10 wherein said determining means computes said departure in accordance with the equations $$D = |X| + |0.5Y| \text{ if } |X| \geq |Y|,$$
and
$$D = |Y| + |0.5X| \text{ if } |Y| > |X|$$

12. The combination as defined in claim 11 wherein said determining means computes said departure $D$ in accordance with the equations $$D = |X| + |0.5Y| - |0.1X| \text{ if } |0.5Y| - |0.1X| \geq 0,$$
and
$$D = |X| \text{ if } |0.5Y| - |0.1X| < 0$$

the commands $X$ and $Y$ being interchanged in said equations if $|Y| > |X|$.

13. The combination as defined in claim 12 wherein said determining means computes said departure $D$ for a three-axes system by adding $|0.3Z|$ to each estimated departure from $X$ and $Y$ commands, where all conditions are satisfied as for a two-axes system, and interchanging the denomination of $X$, $Y$ and $Z$ such that, as interchanged, $|X| \geq |Y| \geq |Z|$.

14. In a numerical control system, the combination comprising:

means for reading axis commands from a stored program for a predetermined departure $D$ of a machine and a corresponding velocity $V$ for the departure $D$;

means connected to receive said axis commands and compute the departure $D$;

a first rate multiplier connected to receive said velocity $V$ and a train of pulses at a given constant frequency F to produce an output train of pulses at a reference frequency which is a function of velocity $V$;

a second rate multiplier connected to receive a number $Q$ and an input train of pulses at said given constant frequency F to produce a train of pulses at a frequency which is a function of the number $Q$;

a third rate multiplier connected to receive departure $D$ and said output train of pulses from said second rate multiplier to produce an output train of pulses at a frequency which is a function of said departure $D$ and said number $Q$;

means for comparing the frequency of said output train of pulses from said first velocity rate multiplier with the frequency of said output train of pulses from said third rate multiplier, and for transmitting a train of pulses at a rate proportional to the difference in frequency; and a counter for providing said number $Q$ connected to receive said train of pulses from said comparing means whereby said number $Q$ is increased until the multipliers of said first, second and third multipliers bear the relation $V = Q \cdot D$, at which time $Q$ is equal to a feedrate number necessary to multiply a clock frequency to obtain a pulse train at a frequency proportionate to the ratio of velocity $V$ to departure $D$ for machine tool motion of said desired velocity $V$.

15. In a numerical control system, the combination comprising:

first means for reading from a stored program numerical data for a desired machine tool departure $D$ and a desired velocity $V$ for the departure $D$, wherein said velocity is represented by a code $f(abc)$ where the "$a$" is a coefficient of a multiplier $R^{a-p}$ for the balance of the code representing a fraction $(.bc)$, where R is the radix of said numerical data and $p$ is a constant;

second means responsive to said first means for producing a first train of pulses equal to the produce of a constant F and said fraction $(.bc)$;

third means responsive to said first means for producing a second train of pulses equal to the product of said constant F, a number $Q$, said departure $D$ and said multiplier $R^{1-p}$ inverted;

fourth means responsive to said second and third means for comparing said first train of pulses with said second train of pulses, and in response thereto, for producing a third train of pulses at a rate proportional to the difference in frequency between said first and second trains of pulses; and a counter for producing said number $Q$ in response to said third train of pulses to increase said second train of pulses to the frequency of said first train of pulses at which time $F \cdot V = Q \cdot D$, and $Q = FRN$, where FRN is a feedrate number equal to the ratio $V/D$.

16. The combination as defined in claim 15 wherein said tool departure data is ready by said first means as axis commands $X$ and $Y$, and said third means includes means responsive to said axis commands for determining said departure $D$ from said axis commands.

17. The combination as defined in claim 16 wherein said determining means computes said departure in accordance with the equations $$D = |X| + |0.5Y| \text{ if } |X| \geq |Y|,$$
and
$$D = |Y| + |0.5X| \text{ if } |Y| > |X|$$

18. The combination as defined in claim 17 wherein said determining means computes said departure $D$ in accordance with the equations $$D = |X| + |0.5Y| - |0.1X| \text{ if } |0.5Y| - |0.1X| \gtrless 0,$$
and
$$D = |X| \text{ if } |0.5Y| - |0.1X| < 0$$

the commands $X$ and $Y$ being interchanged in said equations if $|Y| > |X|$.

19. The combination as defined in claim 18 wherein said determining means computes said departure $D$ for a three-axes system by adding $|0.3Z|$ to each estimated departure from $X$ and $Y$ commands, where all conditions are satisfied as for a two-axes system, and interchanging the denomination of $X$, $Y$ and $Z$ such that, as interchanged $|X| \gtrless |Y| \gtrless |Z|$.

20. The combination as defined in claim 15 wherein:
said third means comprises a rate multiplier having $m+n$ orders, $m$ is the number of digits of said multiplier $Q$ and $n$ is the maximum difference $a-p$ permitted in the coefficient of the multiplier $R^{a-p}$, said rate multiplier having a switch means responsive to said code "$a$" for receiving a train of pulses at a frequency $F$ for multiplication by the contents of said counter, said switch means being adapted to switch said train of pulses to different multiplier orders according to said difference $a-p$ such that said rate multiplier includes a number of orders equal to $m$ plus said difference $a-p$; and
said counter has a number of cascaded orders equal to $m+n$, said counter having a switch responsive to said code digit "$a$" for receiving said third train of pulses from said fourth means such that said counter receives said third train of pulses at the input of $m$ cascaded decades thereof which provide multiplier digits to the corresponding $n$ orders of said rate multiplier having the greatest weight, the most significant of which is the rate multiplier order to which said switch means is currently connected in response to said code "$a$."

21. The combination as defined in claim 20 including:
a linear interpolator connected to receive axis commands and in response thereto produce trains of pulses proportionate to the product of the axis commands and the content of said counter when the rate of said third train of pulses has been decreased to zero;
a source of clock pulses;
a feed generating pulse rate multiplier having $m+n$ orders connected to receive clock pulses from said source at the most significant stage; and
a latching transfer network for transferring the contents of said counter to said feed generating pulse rate multiplier as the multiplier thereof, whereby said linear interpolator receives said clock pulses multiplied by the contents of said counter as a feedrate number equal to the ratio $V/D$.

22. A method as defined in claim 1 wherein said departure $D$ is estimated from axis commands $X$ and $Y$ in accordance with the equation
$$D = |X| + |0.5Y| \text{ if } |X| \gtrless |Y|,$$
and with the equation
$$D = |Y| + |0.5X| \text{ if } |Y| > |X|$$

23. In a numerical control system having a plurality of servosystems for controlling a tool position along a plurality of mutually perpendicular axes, each servosystem controlling said tool position in a different one of said axes, apparatus for obtaining a clock pulse train at a frequency which is a function of desired tool departure D, and in response thereto, obtaining departure pulses as a function of axis commands for each axis servosystem to move said tool at a predetermined velocity, said apparatus comprising:
means for estimating said departure D from said axis commands;
means for providing a train of pulses at a frequency which is a function of said velocity V and estimated departure D; and
a plurality of means for multiplying said train of pulses by said axis commands, one multiplying means for each axis command, to obtain said departure pulses at a rate which provides said predetermined velocity V for the departure D.

24. In a numerical control system, apparatus as defined in claim 23 wherein said estimating means responds to $X$ and $Y$ commands in accordance with the equation
$$D = |X| + |0.5Y| \text{ if } |X| \gtrless |Y|,$$
and with the equation
$$D = |Y| + |0.5X| \text{ if } |Y| > |X|$$

25. In a numerical control system, apparatus as defined in claim 23 wherein said means for providing said train of pulses at a frequency which is a function of said velocity V and estimated departure D comprises means for obtaining a voltage signal proportional to said estimated departure D, a voltage controlled oscillator, and means for applying said voltage signal to said oscillator as a control voltage.

26. In a numerical control system, apparatus as defined in claim 23 wherein said means for providing said train of pulses at a frequency which is a function of said V and estimated departure D comprises means for calculating a feedrate number FRN from said velocity V and estimated departure D in accordance with the relationship defined by the equation $V = \text{FRN} \cdot D$, a source of clock pulses at a constant frequency, and means for multiplying clock pulses from said source by said number FRN.

* * * * *

PO-1050
(5/69)

UNITED STATES PATENT OFFICE
CERTIFICATE OF CORRECTION

Patent No. 3,633,013          Dated January 4, 1972

Inventor(s) Ernst H. Dummermuth

It is certified that error appears in the above-identified patent and that said Letters Patent are hereby corrected as shown below:

| | |
|---|---|
| Abstract, Line 8 | "V=FRN=·D" should read --V=FRN·D-- |
| Col. 1, Lines 34-36 | All of the material contained in Lines 34-36 inclusive should read as follows:<br><br>-- FRN=V/D                    (1)<br>The velocity V is given by a table for all cutting tools and materials, and the departure D is calculated from the programmed distances X, Y and Z. -- |
| Col. 1, Line 73 | "(b)" should read --(bc)-- |
| Col. 2, Line 2 | "simple" should read --ample-- |
| Col. 2, Line 14 | Insert a vertical bar --\|-- after "$\geq$" (equation 2) |
| Col. 2, Line 15 | Insert a vertical bar --\|-- after "<" (equation 2) |
| Col. 2, Line 31 | ">" should read --$\leq$-- (at the end of equation 4) |
| Col. 2, Line 33 | "\|X\|<\|Y\|<\|Z\|" should read --\|X\|$\geq$\|Y\|$\geq$\|Z\|-- |
| Col. 2, Line 36 | Insert --is-- after "largest" |
| Col. 3, Line 27 | "Q.F·D" should read --Q·F·D-- |
| Col. 6, Line 45 | "gate 35" should read --gate 36-- |
| Col. 12, Line 30 | "1" should read --10-- |

PO-1050
(5/69)

UNITED STATES PATENT OFFICE
CERTIFICATE OF CORRECTION (PAGE 2)

Patent No. 3,633,013          Dated January 4, 1972

Inventor(s) Ernst H. Dummermuth

It is certified that error appears in the above-identified patent and that said Letters Patent are hereby corrected as shown below:

| | |
|---|---|
| Col. 12, Line 38 | Delete --i-- after "The" |
| Col. 12, Line 49 | "approximating" should read --approximation-- |
| Col. 12, Line 50 | "$\|X\|<\|Y\|$" should read --$\|X\|\geq\|Y\|$-- |
| Col. 12, Line 65 | Insert --1-- in first column of table under "X" (8th row from the top) |
| Col. 12, Line 67 | "-1.0" should read --+1.0-- (last number in last column of table under "% Error") |
| Col. 12, Line 69 | Insert --X-- after "D=" |
| Col. 14, Line 4 | Insert --from axis commands X and Y-- after "estimated" |
| Col. 14, Line 15 | "$\|X\|\leq\|Y\|\leq\|Z\|$" should read --$\|X\|\geq\|Y\|\geq\|Z\|$-- |
| Col. 14, Line 67 | "$D=\|X\|+\|0.5Y\| if \|X\|\geq\|Y\|$" should read --$D=\|X\|+\|0.5Y\| if \|X\|\geq\|Y\|$-- |
| Col. 15, Line 39 | "$F \cdot V = \cdot Q \cdot D$" should read --$F \cdot V = F \cdot Q \cdot D$-- |
| Col. 16, Line 29 | "of" should read --at-- |
| Col. 16, Line 41 | "produce" should read --product-- |
| Col. 16, Line 45 | "$R^{1-p}$" should read --$R^{a-p}$-- |
| Col. 16, Line 56 | "$F \cdot V = \cdot Q \cdot D$" should read --$F \cdot V = F \cdot Q \cdot D$-- |
| Col. 16, Line 59 | "ready" should read --read-- |

PO-1050
(5/69)

UNITED STATES PATENT OFFICE
CERTIFICATE OF CORRECTION (PAGE 3)

Patent No. 3,633,013      Dated January 4, 1972

Inventor(s) Ernst H. Dummermuth

It is certified that error appears in the above-identified patent and that said Letters Patent are hereby corrected as shown below:

Col. 18, Line 43    Insert --velocity-- after "said"

Signed and sealed this 22nd day of May 1973.

(SEAL)
Attest:

EDWARD M. FLETCHER, JR.
Attesting Officer

ROBERT GOTTSCHALK
Commissioner of Patents